United States Patent [19]

Sander et al.

[11] Patent Number: 4,989,189
[45] Date of Patent: Jan. 29, 1991

[54] MAGNETO-OPTIC PLAYBACK APPARATUS INCLUDING ASTIGMATIC DIFFRACTING MEANS

[75] Inventors: Ingolf Sander, Cuputino; Alan B. Marchant, San Jose, both of Calif.

[73] Assignee: Eastman Kodak Company, Rochester, N.Y.

[21] Appl. No.: 234,767

[22] Filed: Aug. 22, 1988

[51] Int. Cl.$^5$ .................. G11B 13/04; G11B 7/135
[52] U.S. Cl. ................................ 369/13; 360/114; 369/44.11
[58] Field of Search .............. 369/13, 45, 46, 112, 369/109, 110; 365/122; 360/59, 114; 205/201, 201 DF, 201 PF

[56] References Cited

U.S. PATENT DOCUMENTS

| | | | |
|---|---|---|---|
| 4,451,863 | 5/1984 | Yanagida et al. | 369/110 |
| 4,525,625 | 6/1985 | Abe | 250/201 |
| 4,558,440 | 12/1985 | Tomita | 360/114 |
| 4,633,074 | 12/1986 | Kunz | 250/201 DF |
| 4,858,218 | 8/1989 | Takagi et al. | 369/109 |

Primary Examiner—Stuart S. Levy
Assistant Examiner—Hoa Nguyen
Attorney, Agent, or Firm—Warren W. Kurz

[57] ABSTRACT

Apparatus for playing-back information on a magneto-optic recording element includes a diffraction grating for splitting a read beam reflected from the recording element and modified by the recorded information into three beams. Two of such beams (i.e., the upper and lower first order diffracted beams) are used in a differential detection scheme to recover the recorded information, and the third beam (i.e., the zero order beam) is used to provide focus and/or tracking information.

9 Claims, 2 Drawing Sheets

MAGNETO-OPTIC PLAYBACK APPARATUS INCLUDING ASTIGMATIC DIFFRACTING MEANS

BACKGROUND OF THE INVENTION

This invention relates to the field of magneto-optic recording. More particularly, it relates to improvements in magneto-optic playback apparatus.

In magneto-optic recording systems, information is recorded on a magnetic recording element by selectively flipping the magnetic domains along a desired data track in accordance with information to be recorded. To recover this information, a beam of linearly polarized radiation is scanned along the data track. Depending on the vertical orientation of the irradiated magnetic domains, the state of polarization of the incident beam is altered, such alteration being manifested by a slight rotation (e.g. about a degree or so) of the plane of polarization of the incident beam. This small change in polarization is detectable, for example, by passing the modified beam through a polarization analyzer having its axis set at 90°±the slight rotation angle relative to the plane of polarization of the incident beam, and monitoring the variations in intensity of the beam transmitted by the analyzer. Alternatively, and more conventionally, the polarization change is detected by passing the modified beam through a conventional polarizing beam splitter having its axis oriented at 45° relative to the direction of polarization of the playback beam, and positioning a detector in each of the split beams. The respective outputs of the detectors are subtracted to derive the data signal. This well-known differential detection scheme affords the advantage of common-mode rejection of certain noise sources.

In any magneto-optic system, it is necessary to maintain the read beam in sharp focus on the recording element. Moreover, in most systems, the beam's lateral position must be precisely controlled to assure that a desired data track is being followed. To meet these requirements, conventional magneto-optic recording systems incorporate independent sensor systems to produce focus and tracking error signals based on the quality of focus and the tracking accuracy. These error signals can be derived, for example, from the four output signals produced by a so-called "quad-cell", i.e. four independent and equi-sized photodetectors symmetrically arranged to cover the four quandrants of the beam. Prior to being detected by the quad-cell, the beam is astigmatized, usually by passing it through a cylindrical or toric lens. The focus and tracking error signals are derived by summing and differencing the quad-cell outputs in a well-known manner as described, for example, by the disclosure of U.S. Pat. No. 4,410,969 (Maeda). Many other detection schemes (e.g. knife-edge, bi-prism, ring-lens, etc.) are also known for producing these error signals.

In conventional magneto-optic playback systems, it is known to use a plurality of partially reflective/partially transmitting beam-splitters to produce the required number of beams for differential detection and focus/tracking error detection. For example, referring to the prior art system shown in FIG. 1, three beam-splitters may be used. Here, a read beam B, as produced by a laser L, is passed through BS1 which polarizes the beam and is focused onto a magneto-optic recording element R by an objective lens O. Upon being reflected from and modified by the recorded information on the recording element, the beam is split into two beams B' and B" by beam-splitters BS1 and BS2. Beam B' is astigmatized by a toric lens CL and focused onto a quad-cell QC. After suitable signal processing by a control circuit C, focus and tracking error signals, $E_F$ and $E_T$, respectively, are produced, in manner described in the aforementioned patent of Maeda. Beam B" is split again by a polarizing-beam-splitter PBS, and the output thereof is differentially detected by a pair of photodetectors D, D' and a differential amplifier DA. The output of $E_s$ of the differential amplifier represents the recorded information, i.e., the data signal.

The need for three separate beam splitters in magneto-optic systems of the type shown in FIG. 1 presents problems for commercial applications where size, weight, and cost are to be minimized.

SUMMARY OF THE INVENTION

In view of the foregoing, an object of this invention is to provide an exceptionally compact, light-weight and low-cost apparatus for differentially detecting magneto-optically recorded information, and for producing signals indicative of the focus condition and/or tracking accuracy of a read beam on a magneto-optic reading element.

The apparatus of the invention includes (a) means for providing a beam of plane-polarized radiation, (b) means for scanning such beam relative to a magneto-optic recording element bearing marks or other information which produces changes in the plane of polarization of the reflected beam, (c) means for diffracting the astigmatized beam to produce a zeroth order beam and a pair of diffracted beams, (d) first detector means positioned in the zeroth order beam for detecting the focus condition and/or tracking position of the beam on the recording element, and (e) second detector means positioned respectively in each of the diffracted beams for differentially detecting the changes in polarization produced by the recorded marks.

The invention and its advantages will become more apparent to those skilled in the art from the ensuing detailed description of a preferred embodiment, reference being made to the accompanying drawings wherein like reference characters denote like parts.

DETAILED DESCRIPTION OF THE PREFERRED EMBODIMENTS

Figure 2:
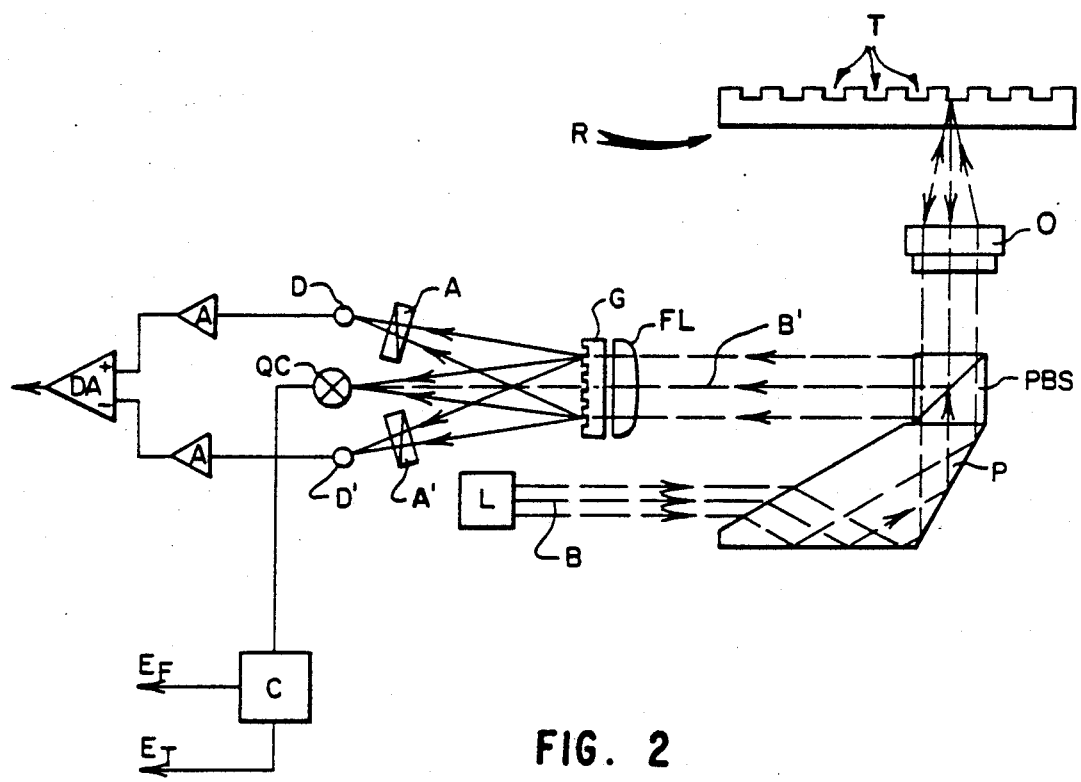
FIG. 2 is a schematic illustration of a magneto-optic playback apparatus embodying the invention.

Referring to the drawings, FIG. 2 schematically illustrates a magneto-optic playback system for recovering prerecorded information on a magneto-optic element R. The recording element is of conventional design and may comprise, for example, a transparent plastic or glass substrate having on one surface thereof a magneto-optic recording layer comprising any one of the variety of magneto-optic materials which exhibit a relatively strong Kerr effect. A particularly preferred material is a ternary compound of terbium, iron, and cobalt. The substrate surface underlying the recording layer may be embossed to provide a plurality of equally-spaced tracks T along which data is recorded. Recovery of such data is effected by the apparatus described below.

A beam of plane-polarized radiation B as produced, for example, by a continuous-output laser L, is deflected and anamorphically expanded and circularized by a Littrow-type prism P. The beam emerging from the prism passes through a modified polarizing beam splitter PBS and is brought to sharp focus on the recording element by an objective lens O. Upon encountering the magneto-optic recording layer, the plane of polarization is slightly rotated (i.e. by the magneto-optic Kerr effect) by a small angle, the sign of such angle depending upon the direction of the vertical magnetization, up or down, of the magnetic domains constituting the recorded information. Upon being reflected by the recording element, beam B is re-collimated by lens O and deflected 90° by the beam splitter to produce beam B'. As indicated above, the plane of polarization of beam B' now depends upon the recorded information. Beam B' then passes through an astimatizing field lens assembly FL which serves to astigmatize and focus the beam, and then through a diffraction grating G. The field lens assembly may be a single element toric lens (as shown) having both astigmatizing and focusing properties, or, alternatively, it may comprise multiple elements, such as cylindrical and spherical elements. Grating G is designed to diffract the astigmatized beam to produce a zeroth order beam O and upper and lower first order diffracted beams +1 and −1, respectively. The zeroth order (i.e. non-diffracted) beam is focused onto a quad cell QC, the output of such cell being fed to a control circuit adapted to produce a focus tracking error signal $E_F$ and/or a tracking error signal $E_T$. These control signals may be used to control the position of the lens O so as to maintain beam B in sharp focus on the recording element's recording layer and, if desired, to precisely center the beam relative to a desired data track T.

Figure 3:
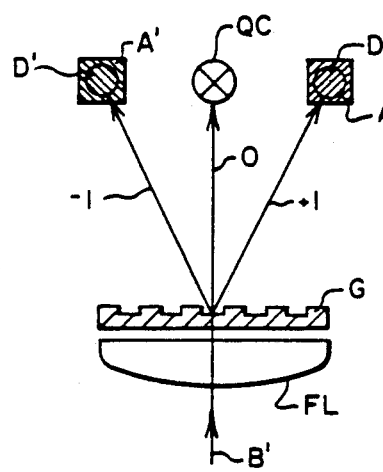
FIG. 3 is a schematic illustration of a portion of the apparatus shown in FIG. 2.

To achieve differential detection of the recorded information, a pair of polarization analyzers A, A' are positioned in the diffracted first order beams and the respective throughputs of analyzers A and A' are detected by photodetectors D, D', respectively. The analyzers may be in the form of plane-polarized filters mounted as windows on the respective faces of the photodetectors. The output of such photodetectors, after suitable amplification by amplifiers A, are subtracted by a differential amplifier DA to produce the data signal $E_S$. As shown in FIG. 3, analyzers A and A' may be arranged so that their polarization planes are at 45° angles relative to the nominal plane of polarization of beam B', here assumed to be vertical, and so that the respective planes of polarization of the analyzers are 90° apart. Note that the analyzers may be set at other symmetrical orientations to optimize the signal and noise characteristics of the particular system. This additional optimization is not permitted with conventional differential detection systems. The lines of grating G are symmetric (unblazed) so that the intensities in the upper and lower orders are precisely equal. A preferred grating has 80 lines/mm, each line being 6 microns wide and 0.6 microns deep. Quite unexpectedly, it has been found that the grating does not substantially disturb the polarization characteristics of the diffracted beams.

Figure 4:
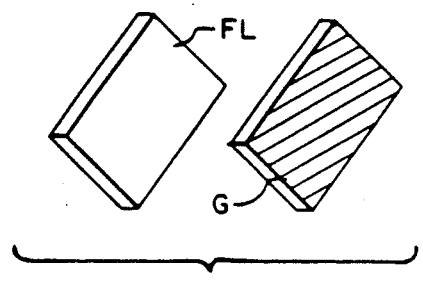
FIG. 4 illustrates the orientation of a diffraction grating and cylindrical lens used in the FIG. 2 apparatus.

Although the grating and field lens are shown as discrete elements, it should be apparent that these elements could be integral. Referring to FIG. 4, a preferred grating has its lines disposed at a 45° angle relative to the astigmatic lens axis so that the grating is aligned parallel or perpendicular to the incident polarization direction.

As indicated above, quad-cell detection is only exemplary of the many different schemes for detecting the focus and tracking conditions of the read beam. The zeroth order beam could, for example, be knife-edge detected to provide a focus error signal. In this case, the astigmatic field lens FL would be replaced by a half-aperture spherical lens, and the quad-cell could be replaced with a split-cell detector.

Figure 1:
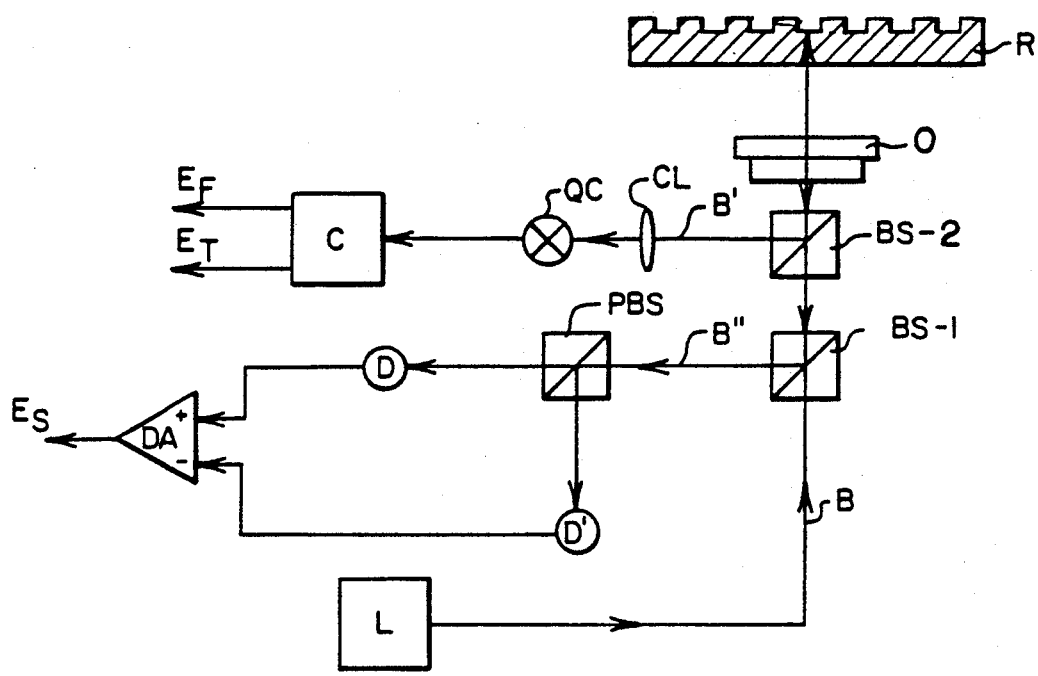
FIG. 1 is a schematic illustration of conventional magneto-optic playback apparatus.

From the foregoing, it will be appreciated that the apparatus depicted in FIG. 2 can be made relatively light weight and compact relative to the apparatus shown in FIG. 1. The grating is substantially smaller and lighter than the pair of cube-type beam splitters commonly used in prior art systems to produce three beams from one, and the grating is less expensive to fabricate and incorporate. Moreover, a grating is more optically efficient at producing three beams from one, i.e., there is substantially less light loss, and, because of its this nature, a grating will introduce less aberration into the read beam then a beam-splitter cube.

The invention has been described in detail with particular reference to certain preferred embodiments thereof, but it will be understood that variations and modifications can be effected within the spirit and scope of the invention.

What is claimed is:

1. Apparatus for playing back information recorded on a magneto-optic recording element, said apparatus comprising:
   (a) means for providing a beam of plane polarized radiation;
   (b) means for scanning said beam relative to a magneto-optic recording element having information recorded thereon, said recorded information being adapted to product changes in the plane of polarization of said scanning beam;
   (c) astigmatizing means positioned in the path of said beam as modified by said information for producing an astigmatized beam;
   (d) a diffraction grating for diffracting the astigmatized beam to produce a zeroth order beam having a certain amplitude and a pair of diffracted beams of substantially equal amplitude;
   (e) first detector means positioned in the path of said zeroth order beam for detecting the focus condition or tracking position of said beam on the recording element; and
   (f) second and third detector means positioned respectively in the path of each of said diffracted beams for differentially detecting said changes in the plane of polarization for information signal retrieval.

2. The apparatus as defined in claim 1 wherein the amplitude of each of said diffracted beams is approximately equal to the amplitude of the zeroth order beam.

3. The apparatus as defined by claim 1 wherein said astigmatic means comprises a toric lens or astigmatic lens assembly.

4. The apparatus as defined by claim 2 wherein said diffraction grating has a uniform pitch.

5. The apparatus as defined by claim 1 wherein each of said second and third detector means comprises a polarization analyzer positioned in the path of each of said diffracted beam, and a radiation-sensitive device positioned to receive radiation transmitted by said analyzer, said analyzer having a polarization axis which is oriented in a predetermined manner with respect to the plane of polarization of said irradiation beam.

6. Apparatus for reading information on a magneto-optic recording element, said element having a plurality of data tracks along which said information has been previously written, said apparatus, comprising:
(a) means for scanning the recording element along a desired data track with a focused beam of plane-polarized radiation, the information written along said track causing the state of polarization of the focused beam to be modulated;
(b) means for directing said beam, upon being modulated by said information on the recording element, along a predetermined path;
(c) astigmatizing means positioned in said predetermined path for astigmatizing the modulated beam;
(d) means positioned along said predetermined path for diffracting said astigmatized and modulated beam into a zeroth order beam and plus and minus first order diffracted beams, said zeroth order and diffracted beams being spatially separated;
(e) first detection means positioned in said zeroth order beam for detecting the focus condition of said beam on the recording element or the displacement of said beam relative to said data track;
(f) second and third detection means positioned, respectively, in said plus and minus first order diffracted beams, for detecting the modulation of said beam as caused by the written information.

7. The apparatus as defined by claim 6 wherein each of said second and third detection means comprises a radiation-sensitive element and a plane-polarized filter, the plane of polarization of one filter being angularly disposed with respect to the plane of polarization of the other filter.

8. The apparatus as defined by claim 6 wherein said astigmatizing means comprises a toric lens.

9. The apparatus as defined by claim 6 wherein said diffracting means comprises a diffraction grating.

* * * * *